Oct. 20, 1942.  E. V. COLLINS  2,299,381
PLOW FOR TRASH COVERING
Filed July 29, 1940   2 Sheets-Sheet 2
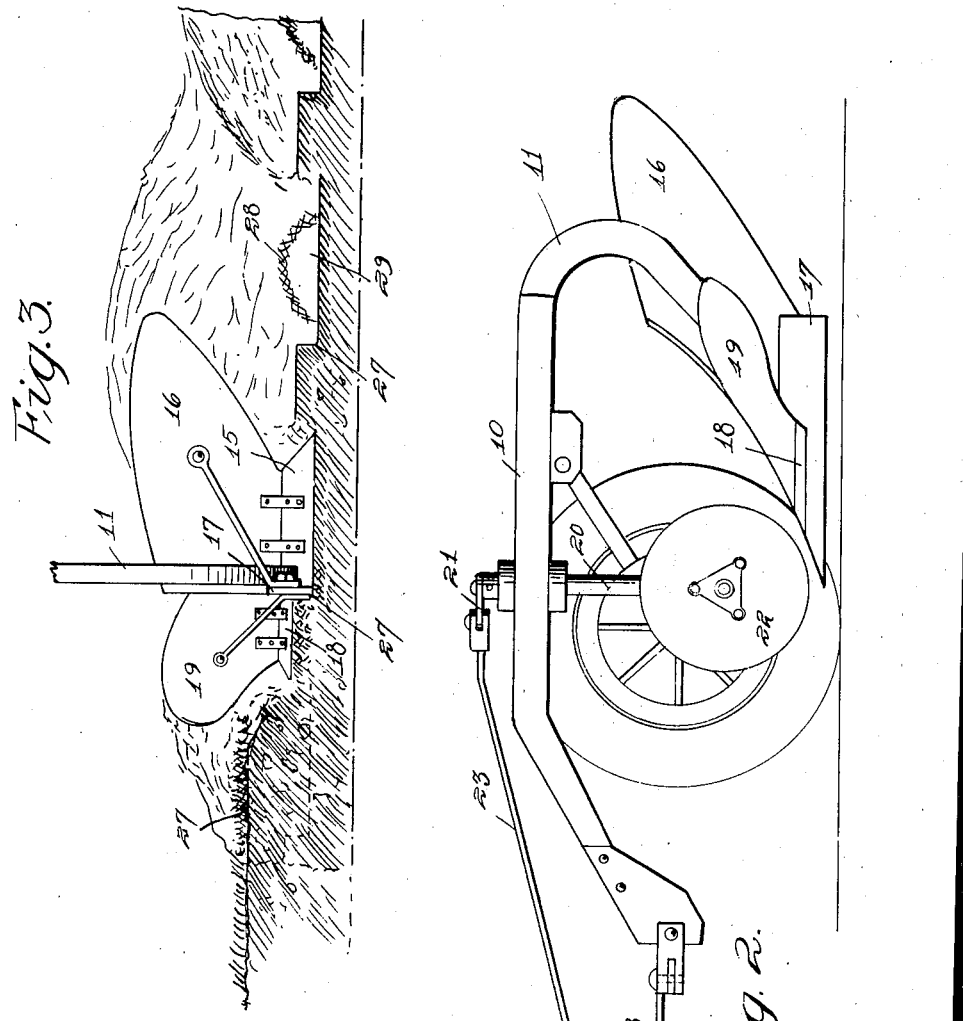
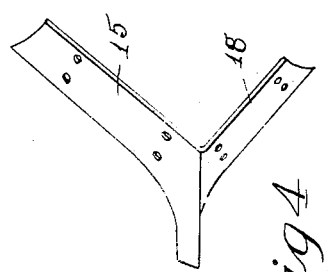
Inventor
Edgar V. Collins Patented Oct. 20, 1942

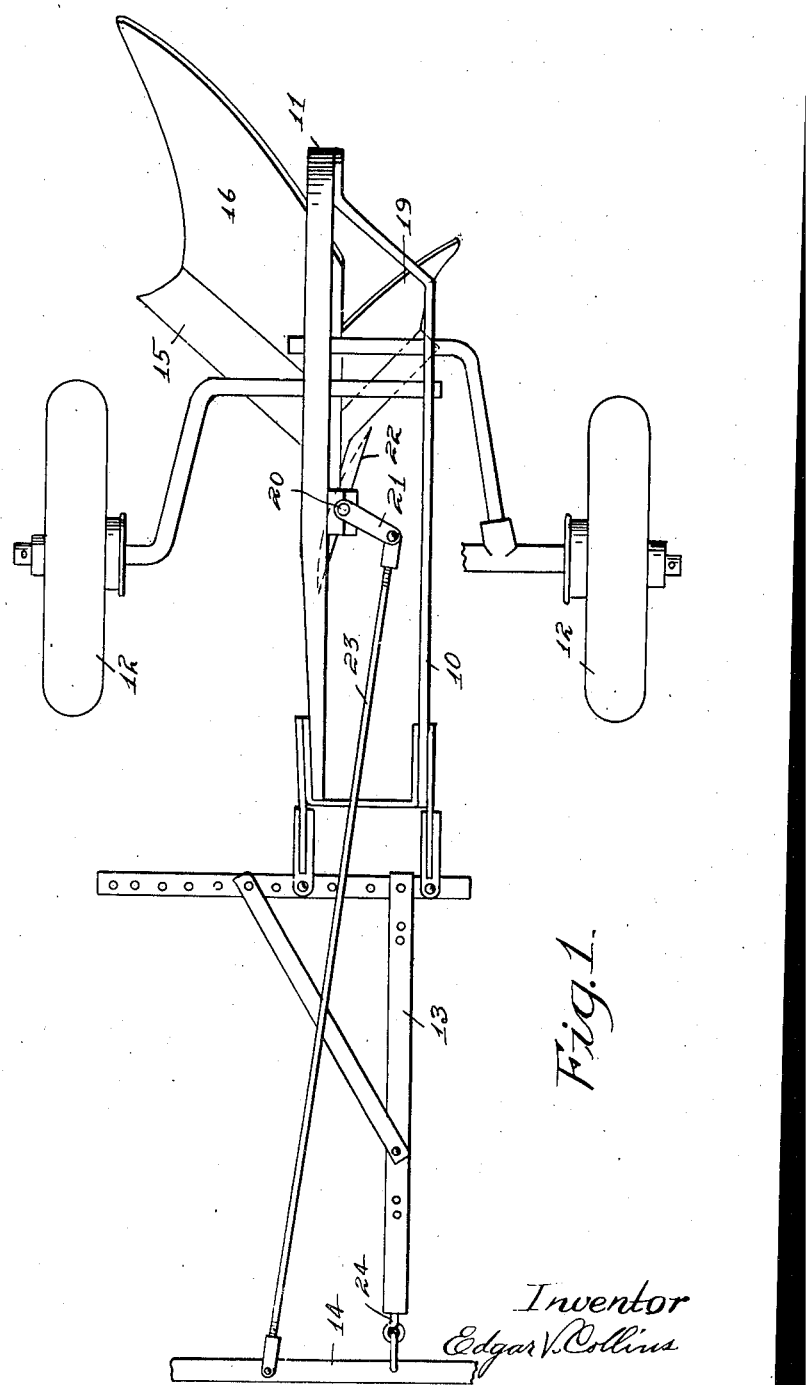

2,299,381

UNITED STATES PATENT OFFICE 2,299,381

PLOW FOR TRASH COVERING

Edgar V. Collins, Ames, Iowa, assignor to Iowa State College Research Foundation, Ames, Iowa, a corporation of Iowa Application July 29, 1940, Serial No. 348,166

4 Claims. (Cl. 97—100)

In the art of plowing with the use of small-powered tractors the operator may use a plow of the class known as 2 bottom 12 inch plows, or the like, or he may use a single plow of 16 or 18 inches. The said two bottom plow has a more suitable capacity for said small powered tractors, but it does not cover trash with great efficiency, and with a wide one bottom plow the friction caused by the mould-board forcing the land side of the plow against the land very substantially decreases the capacity of the plow to cover a given area in a given time.

One of the objects of my invention is to provide means for substantially reducing the friction caused by the pressure of the land side of the plow against the land side of the furrow, so that a tractor of given power may advance a plow cutting a wider path than can be cut with one ordinary plow.

A further object is to provide means for throwing the trash on the ground surface over on the unplowed land and holding it in place by a thin furrow slice of earth, and finally throwing said trash and furrow slice into the bottom of the furrow previously formed by the plow, with said trash at the lower portion of said furrow and completely covered by the furrow slice.

A further object is to provide an improved method of handling and covering trash, which consists in first turning over a thin furrow slice upon the earth at the land side of the furrow being formed by the plow, to thereby firmly hold the trash in position temporarily, and finally turning over a thick furrow slice which includes the said thin furrow slice, the trash covered thereby, and a relatively thick furrow slice of the earth beneath said covered trash, to thereby deposit in the furrow all of the trash, the thin furrow slice which holds the trash in position with the thick furrow slice in inverted position on top, to thereby firmly compact the trash and prevent its being spread over the surface during a plowing operation.

A further object is to provide improved means for automatically guiding a plow in position for cutting a full sized furrow slice, and at the same time performing the operation of cutting trash from in front of the plow and throwing it to the side opposite from the plow share and compacting the trash and covering it with earth for temporarily holding it in position.

In the accompanying drawings—

Figure 1 shows a top or plan view of my improved plow;

Figure 2 shows a side view of same;

Figure 3 shows a rear elevation of the plow bottom members and a sectional view of the earth being operated on by the plow; and Figure 4 shows a detail plan view of the plow share member.

My improved plow comprises a frame 10 and a plow beam 11 carried by the frame and supporting wheels 12 for the frame. At the front of the frame is a tongue 13, and an equalizing bar 14 is pivoted to the tongue.

Fixed to the beam is a plow having the usual share 15, mould-board 16 and land side 17.

Secured to the plow beam at the land side of the plow is a relatively small plow share 18 and mould-board 19. The lower edge of the plow share 18 is positioned a substantial distance above that of the plow share 15, as shown in Figs. 2 and 3, and the width of the mould-board 19 is less than that of the mould-board 16. This plow share and mould-board extend laterally and rearwardly from the main plow in a direction opposite from that of the main plow. As shown in the drawings, the main plow turns its furrow slice to the right, and the auxiliary plow throws its furrow slice to the left.

Carried by the plow beam in front of the main plow is an upright rotatable shaft 20, having a laterally extended arm 21 at its top. Rotatably mounted on the lower end of said shaft is a dish-shaped disc 22 in upright position and having its concave side at the left. This disc is inclined relatively to a fore and aft line through the frame in a direction for throwing trash and a shallow furrow slice toward the left or away from the main plow. Attached to the arm 21 is a rod 23 which extends forwardly and is pivoted to the equalizing bar 14. The tongue 13 is connected to the equalizing bar 14 by a bolt 24 which is slidingly mounted in brackets 25 on the tongue, and an extensile coil spring 26 is mounted on the bolt 24 for yieldingly holding the tongue forwardly.

I have demonstrated in practice that when a tractor having limited traction power is used, a wider plowed area will be covered than can be plowed with the present plow equipment, and that a more efficient trash coverage is effected by my new method.

Assuming that the plow is used for spring plowing on land formerly planted to corn, and upon which broken corn stalks and other trash are resting, then as my improved plow is advanced, the dish-shaped disc will cut a path through the trash and throw the trash toward the left. Then the small plow will turn a relatively shallow furrow slice toward the left; upon the upper surface of this furrow slice before it is turned is the trash thrown by the disc and the trash present upon the surface, all of this is turned over and buried under the shallow furrow slice and is thereby firmly compacted and temporarily held. During this operation, and because the main plow goes much deeper into the soil, a vertical ridge is formed at 27, as shown in Fig. 3. The land side of the main plow rests against this ridge and is guided thereby; the friction of the furrow slice being turned to the right by the main mould-board, holds the main plow against this ridge. This frictional resistance to the advance of the plow is greatly minimized by the auxiliary plow and the dish-shaped disc as follows: The friction of the furrow slice against the mould-board 19 directly opposes the lateral pressure of the land side of the main plow upon said ridge; also the dish-shaped disc, by being inclined rearwardly and to the left tends to force the implement toward the right. Hence, the amount of the frictional resistance of the main plow land side against the unplowed ground is greatly reduced, and I have demonstrated in practice that under soil conditions and with a tractor of limited capacity, which make it impossible to use an ordinary two bottom plow of given size, my improved implement may be used to plow an area substantially wider than that which could be plowed with the ordinary two-bottomed plow or a single plow of relatively great width.

Another advantage of my improved implement is that of minimizing lateral movements of the plow relative to the tractor. Under certain plowing conditions the lateral pressure caused by the friction of the furrow slice upon the mould-board tends to swing the plow toward the left. I have overcome this objection by the dish-shaped disc and associated parts. When there is considerable resistance to the advance of the plow, as, for instance, when it is cutting too deeply into the unplowed ground, the plow frame moves rearwardly relative to the equalizing bar by compressing the spring 26. This causes the rod 23 to increase the angularity of the disc 22 and to thereby tend to move the plow to the right, and when the plow swings too far toward the right the disc is moved toward a fore and aft line relative to the plow frame and thus lateral pressure is relieved so that the plow and the plow frame may return to normal position relative to the tractor.

In Figure 3 I have illustrated the position of the trash 28 and furrow slice turned, 29, over on top of the unplowed ground by the auxiliary plow, and at the right of said figure I have illustrated their position after the main plow has turned over its furrow slice.

I have found it to be advantageous to firmly weld the main plow share 15 to the auxiliary plow share 18 as shown in Fig. 4.

I claim as my invention:

1. The combination of a plow, a tongue connected to the plow, an equalizing bar connected to the tongue, a dish-shaped disc pivotally supported above the plow point, a laterally extended arm connected with the disc and a rod connected to said arm and to said equalizing bar, and a spring for forcing the tongue forwardly relative to the equalizing bar.

2. The combination with a plow having a plow share, a mould board and a land side, of a concave disc positioned in advance of the plow with its concave side opposite the mould board and at such elevation as to throw surface trash laterally away from the mould board side of the plow, and a second plow having a plow share and a mould board supported in position with its mould board in the line of the trash furrow turned by said disc for turning a furrow over the said trash furrow for compacting and holding it, said second plow having its plow share spaced substantially above that of the main plow and having the rear edge of the mould board a substantial distance in front of the rear edge of the land side of the first plow to thereby form a furrow land side relatively narrow vertically to receive the side thrust of the land side of the main plow, and whereby the combined action of the concave disc and the second plow and the narrow furrow land side will minimize the friction of the land side of the main plow.

3. The combination with a plow having a plow share, a mould board and a land side, of a concave disc supported in position to move surface trash in a direction laterally away from the mould board of the plow, and a second plow supported in position at the rear of the concave disc and at the land side of the first plow and having its lower surface substantially above that of the first plow and whereby a relatively thin furrow slice is thrown over the trash previously formed into a furrow by the concave disc.

4. The combination with a plow having a plow share, a mould board and a land side, of a concave disc positioned in advance of the plow with its concave side opposite the mould board and at such elevation as to throw surface trash laterally away from the mould board side of the plow, and a second plow having a plow share and a mould board supported in position with its mould board in the line of the trash furrow turned by said disc for turning a furrow over the said trash furrow for compacting and holding it, said second plow having its plow share spaced substantially above that of the main plow and having the rear edge of the mould board a substantial distance in front of the rear edge of the land side of the first plow to thereby form a furrow land side relatively narrow vertically to receive the side thrust of the land side of the main plow, and whereby the combined action of the concave disc and the second plow and the narrow furrow land side will minimize the friction of the land side of the main plow, means for pivotally supporting said disc, a tongue connected to the plow, an equalizing bar connected to the tongue, a laterally extended arm connected to the disc, a rod connecting the arm and the equalizing bar, and a spring for forcing the tongue forwardly relative to the equalizing bar.

EDGAR V. COLLINS.